Figure 1:
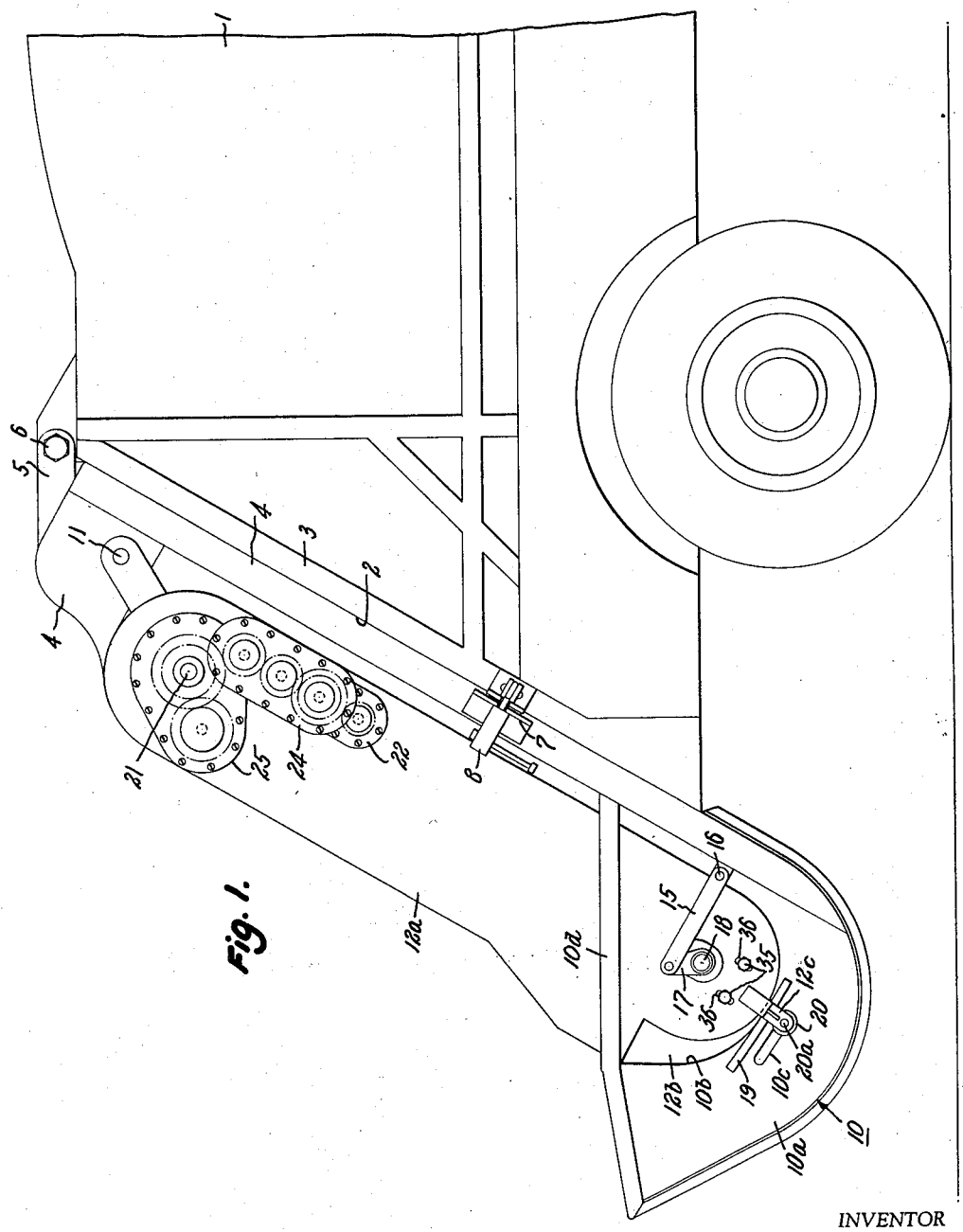

Dec. 30, 1958 T. W. BISHTON 2,866,568
PACKER CONVEYOR FOR REFUSE VEHICLES
Filed June 24, 1953 9 Sheets-Sheet 1

INVENTOR
Thomas W. Bishton
BY
ATTORNEY

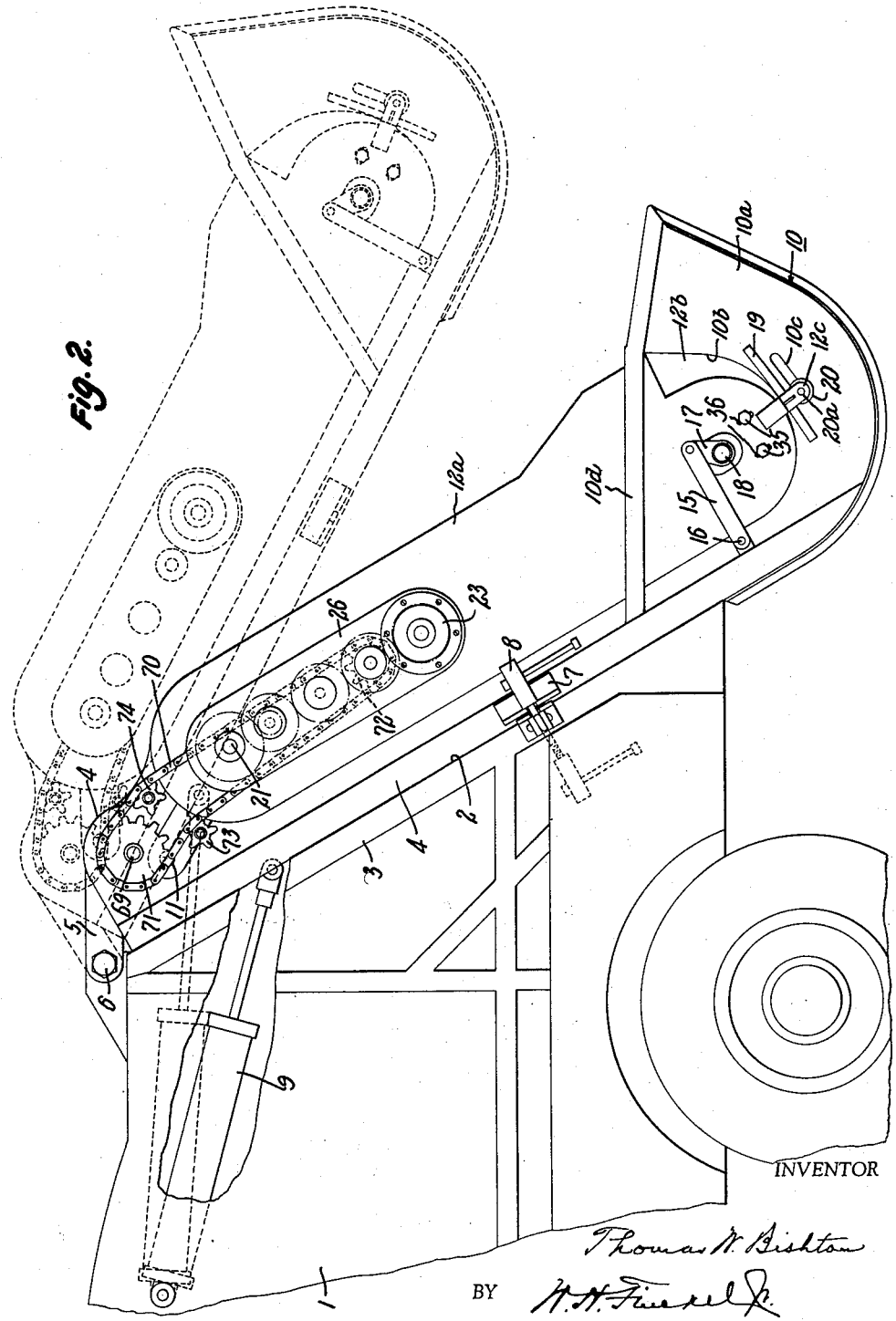

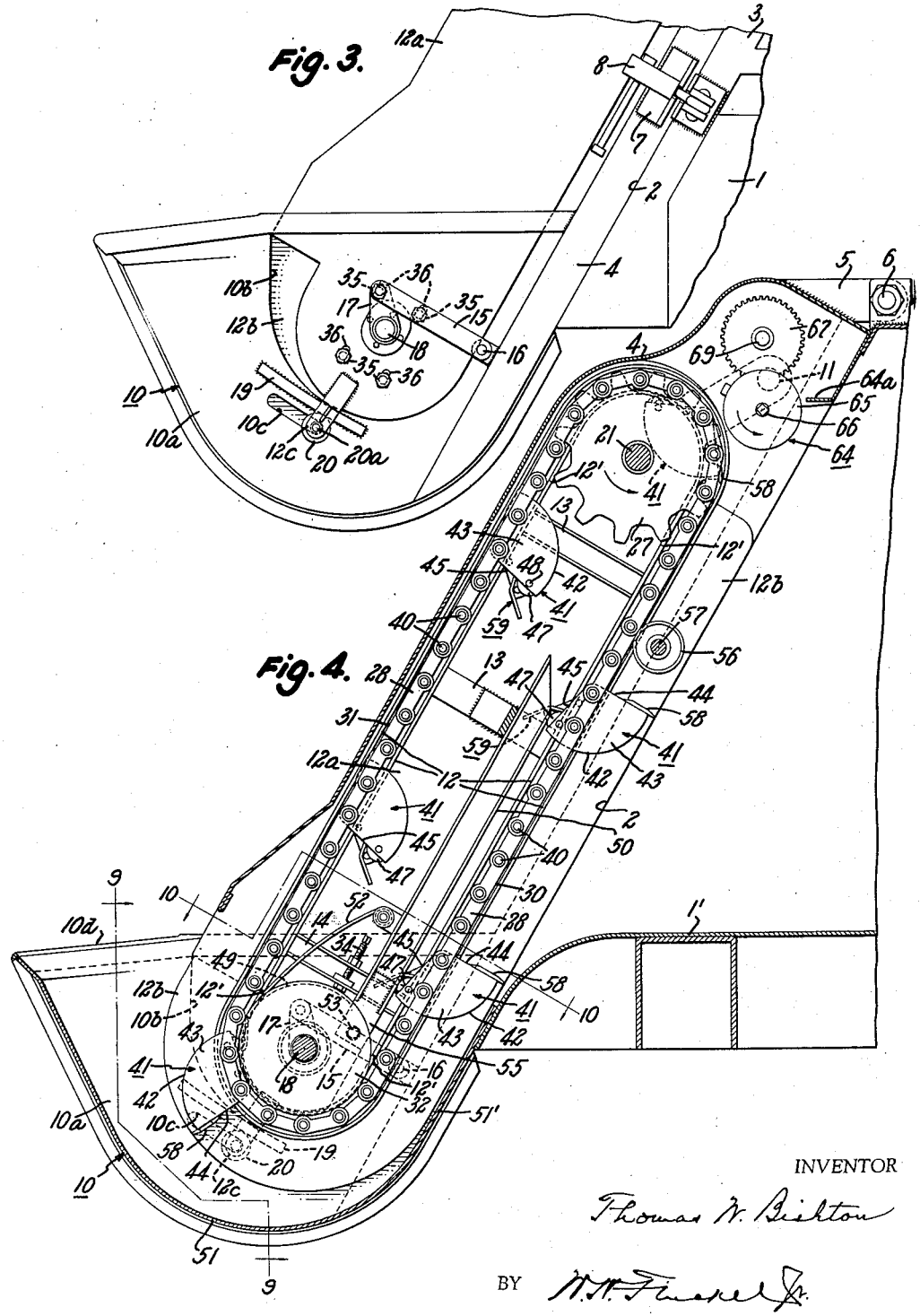

Dec. 30, 1958 T. W. BISHTON 2,866,568
PACKER CONVEYOR FOR REFUSE VEHICLES
Filed June 24, 1953 9 Sheets-Sheet 4

INVENTOR
Thomas W. Bishton
BY
ATTORNEY

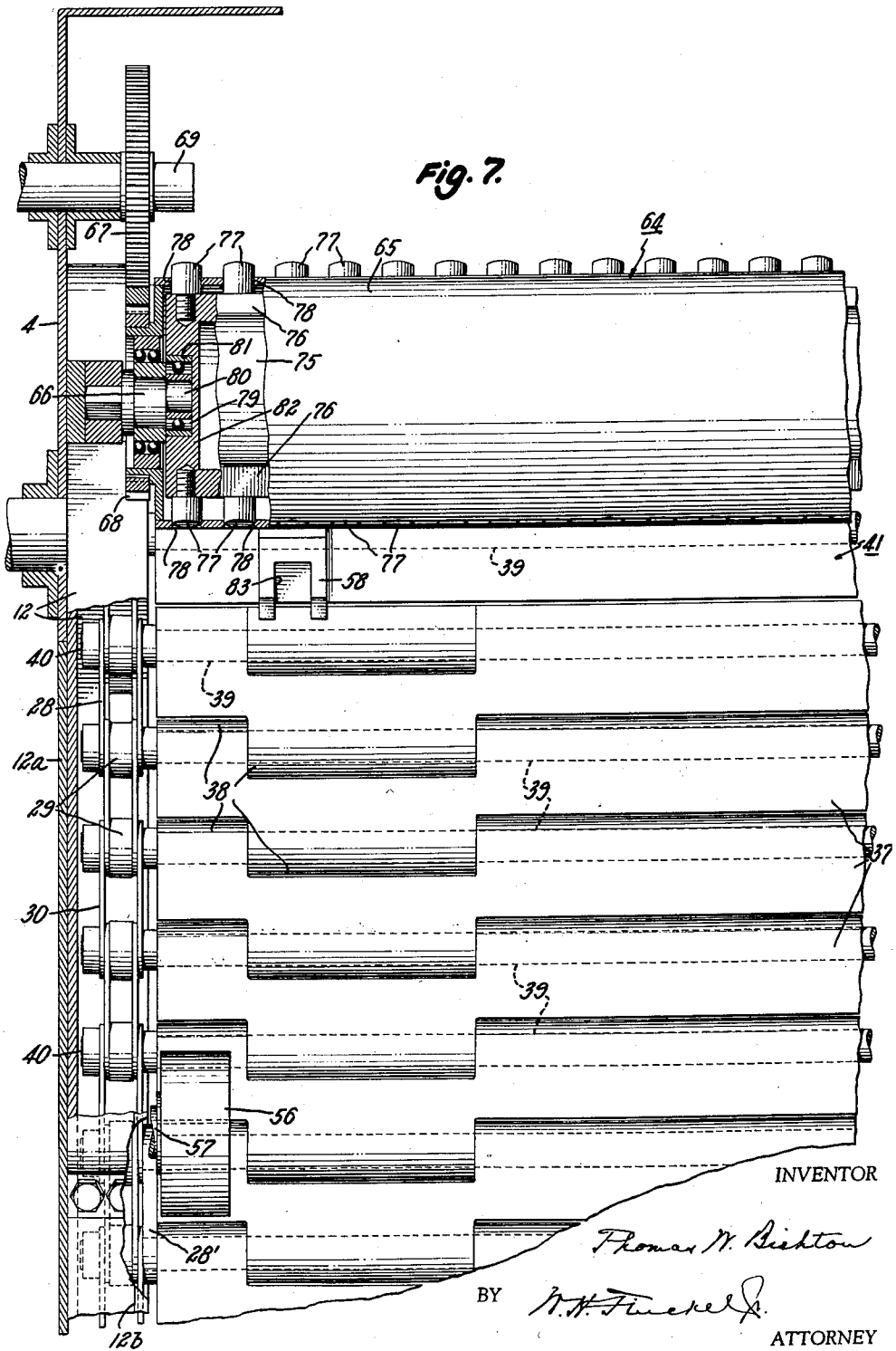

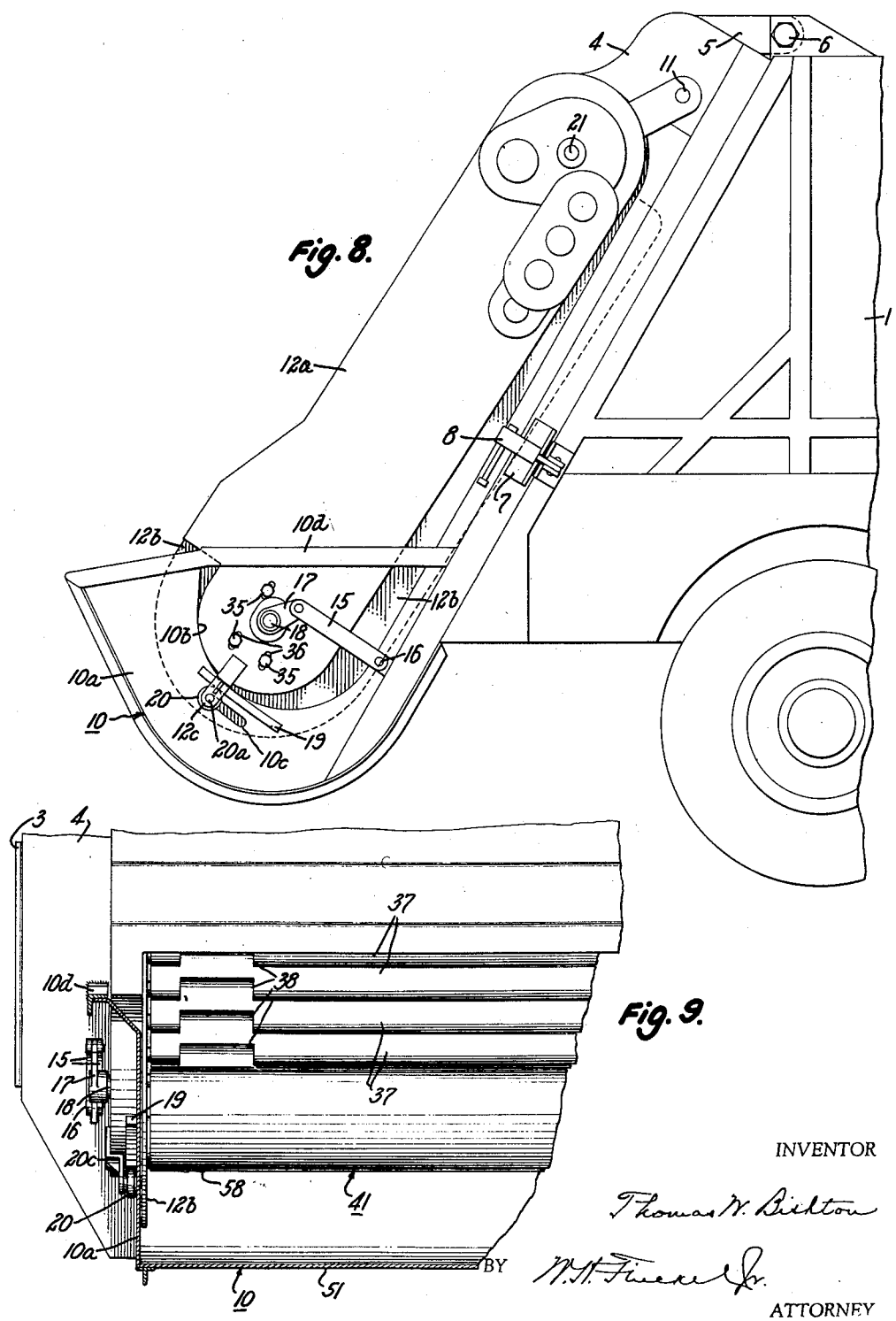

Dec. 30, 1958  T. W. BISHTON  2,866,568
PACKER CONVEYOR FOR REFUSE VEHICLES
Filed June 24, 1953  9 Sheets-Sheet 7

INVENTOR
Thomas W. Bishton
BY W. N. Finckel Jr.
ATTORNEY

Dec. 30, 1958  T. W. BISHTON  2,866,568
PACKER CONVEYOR FOR REFUSE VEHICLES
Filed June 24, 1953  9 Sheets-Sheet 8

INVENTOR
Thomas W. Bishton
BY
ATTORNEY

Dec. 30, 1958        T. W. BISHTON        2,866,568
PACKER CONVEYOR FOR REFUSE VEHICLES
Filed June 24, 1953                                9 Sheets-Sheet 9
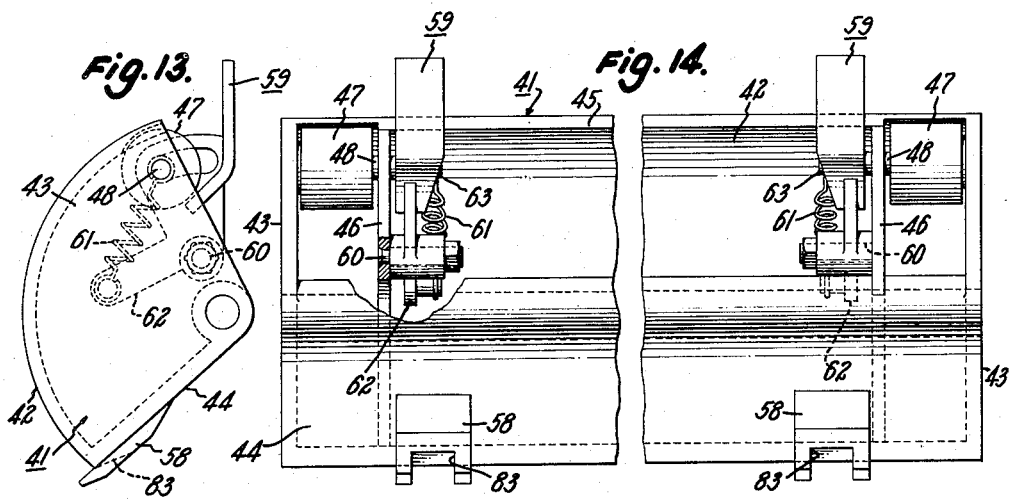
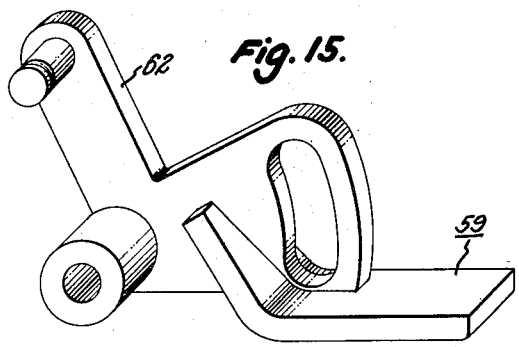
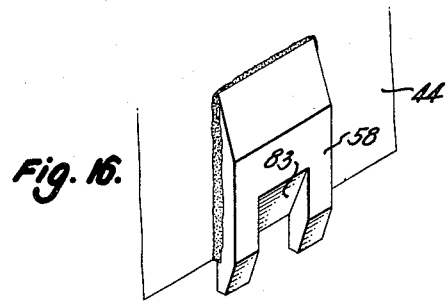
INVENTOR
Thomas W. Bishton
BY
ATTORNEY

United States Patent Office 2,866,568
Patented Dec. 30, 1958

2,866,568

PACKER CONVEYOR FOR REFUSE VEHICLES

Thomas W. Bishton, Berryville, Va.

Application June 24, 1953, Serial No. 363,805

9 Claims. (Cl. 214—83.26)

This invention relates to packer conveyors, and it has special reference to such conveyors for use with refuse collection vehicles particularly those of the closed body type employed for the collection and packing-for-transportation of domestic and municipal refuse.

The invention comprises, broadly, a packer conveyor of the type referred to including an endless conveyor member preferably arranged at an angle with respect to the rear end of the vehicle body, and, on its working or loading pass, travelling upwardly with relation to the body and through a hopper in which refuse may be manually deposited, this conveyor member being furnished with a plurality of retractable vanes projecting from the working face of the conveyor member during their functioning on its working pass but capable of retraction to substantially co-planar arrangement with respect to the said working face of the conveyor member, and thus being adapted, while projected, to progressively move refuse from the hopper and into the body of the vehicle.

Broadly considered, this type of conveyor is not novel, but in those now known operative difficulties are encountered when there are deposited in the hopper articles and materials which cannot be moved or advanced by the vanes of the conveyor member into the body, thus causing jamming and possible injury or breakage of the conveyor mechanism. Furthermore, in some known conveyors the conveyor member, and particularly its vanes, are apt to carry over refuse from its working pass onto its idle pass, which also may result in jamming or breakage.

One object of the present invention is to provide means associated with, or forming parts of, the conveyor member whereby these operative difficulties may be overcome.

Another object is to provide a packer conveyor of the type referred to in which the conveyor member provides a closure for the end of the vehicle body with which it is associated, thereby to seal such end against escape of refuse conveyed thereinto and packed therein by the conveyor member.

A further object of the invention is the provision of a packer conveyor of the type referred to in which the conveyor member and the associated walls are formed in a manner to crush and pack the refuse for increasing the weight per unit volume of refuse in the vehicle body.

Other objects and advantages of the apparatus of the invention will be apparent hereinafter, all as will be more particularly described and finally claimed.

Figures 5, 6:
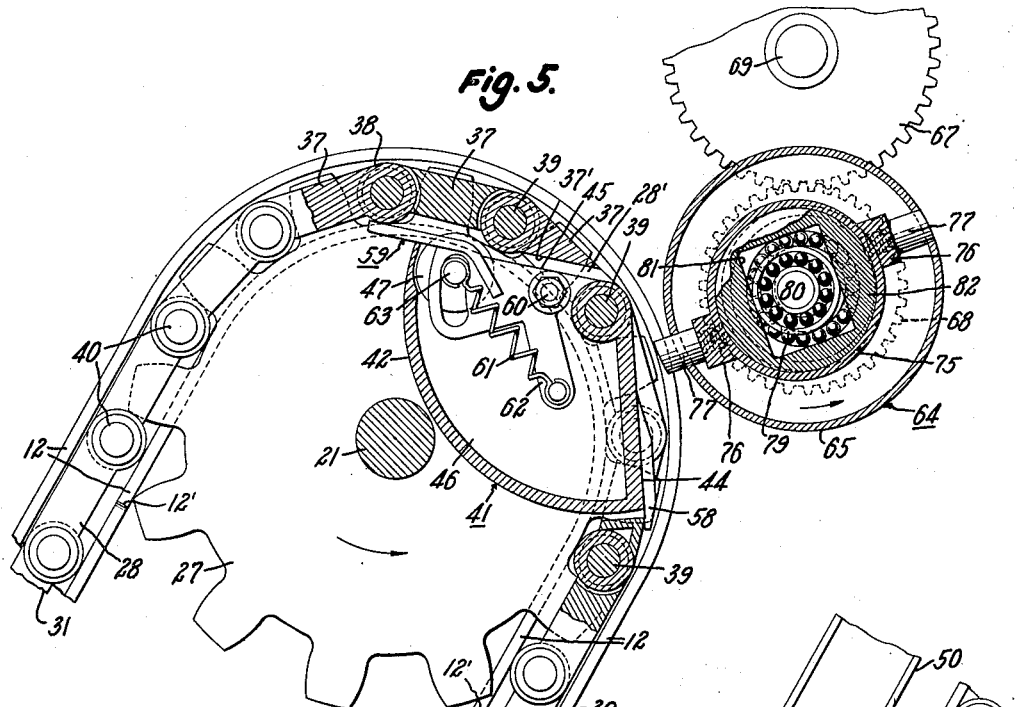
Figure 10:
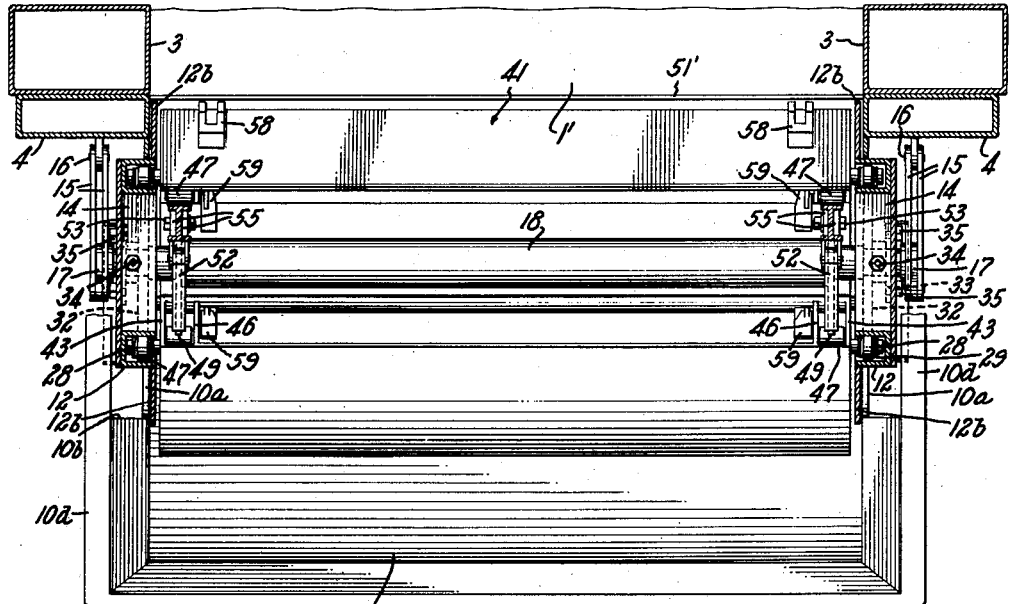
Figure 11:
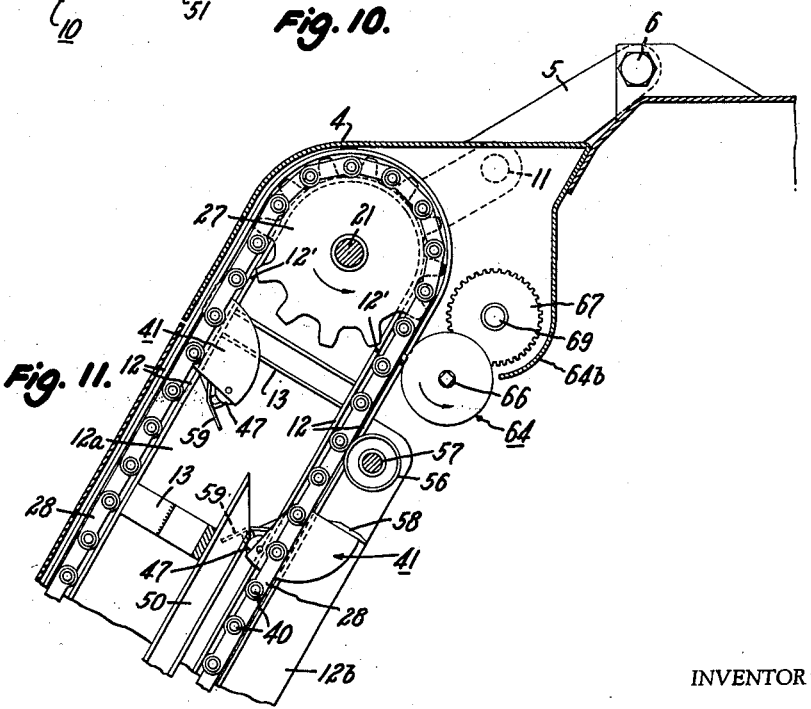
Figure 12:
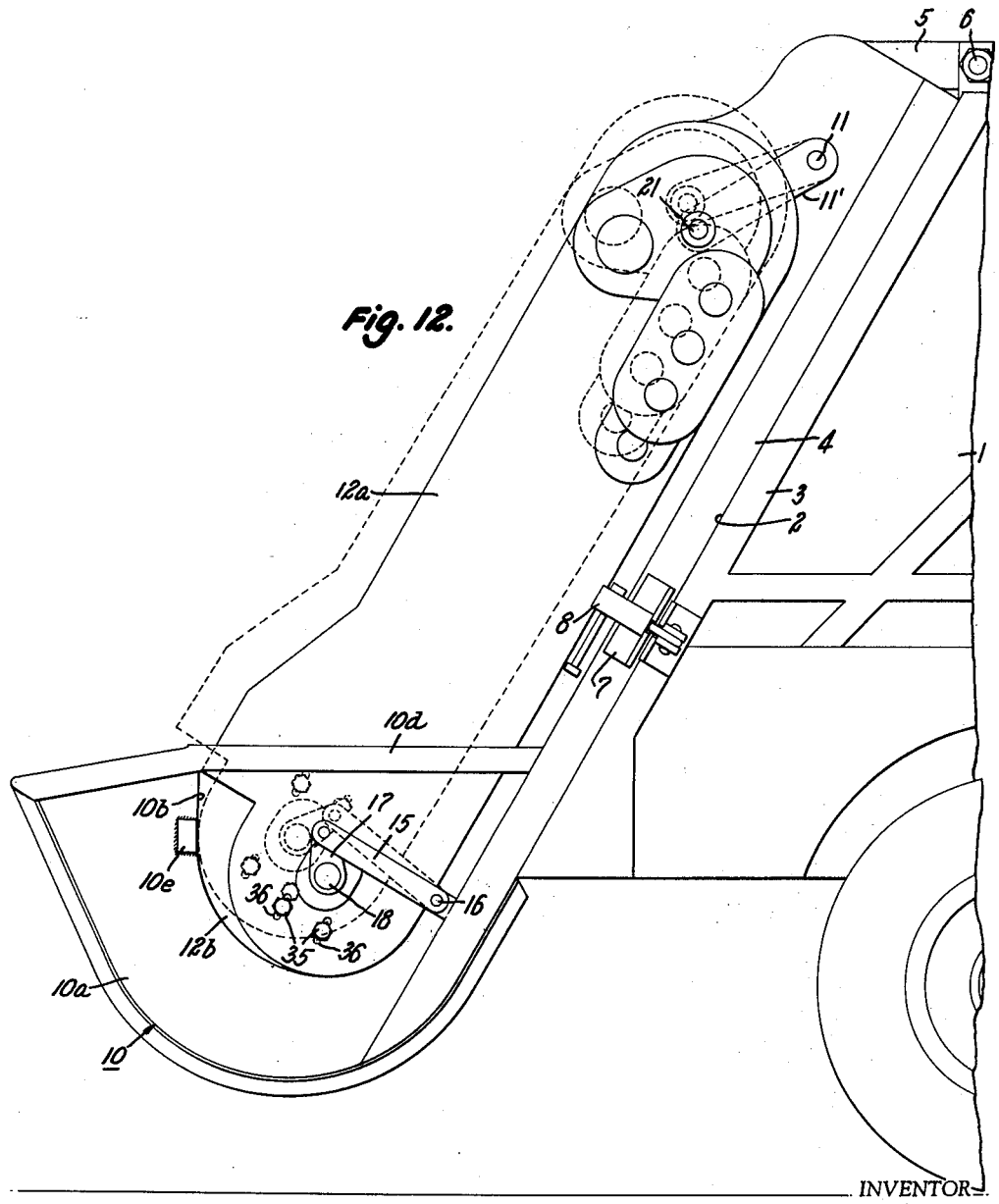

In the accompanying drawings illustrating the invention, in the several figures of which like parts are similarly designated, Fig. 1 is a fragmentary side elevation of the right-hand side of a refuse collection vehicle with the packer conveyor of the invention applied thereto, Fig. 2 is a view similar to Fig. 1, but showing the left-hand side of the vehicle, and indicating in broken lines the conveyor mechanism in raised position suitable for discharge of the load from the vehicle body, Fig. 3 is an enlarged fragmentary side elevation of the lower end of the conveyor mechanism in association with the vehicle body and showing in more detail the mounting of such lower end with respect to the hopper, Fig. 4 is a sectional, right-hand side elevation of the conveyor mechanism and its associated hopper and vehicle body, Fig. 5 is a further enlarged sectional elevation of the upper, or drive, end of the conveyor and its associated mechanism, Fig. 6 is a view similar to Fig. 5, but showing the lower end of the conveyor mechanism, Fig. 7 is a fragmentary sectional elevation viewed from the right of Fig. 5, with portions of the near flange of the chain guide broken away and showing the parts of the clearing mechanism in a somewhat different position of rotation, Fig. 8 is a view similar to Fig. 1, but showing a position which may be assumed by the conveyor mechanism assembly with respect to the hopper when materials or articles which are dumped into the hopper tend to cause jamming of the conveyor member, Fig. 9 is a transverse sectional elevation of the hopper and conveyor member taken on the line 9—9 of Fig. 4, Fig. 10 is a transverse sectional elevation taken on the line 10—10 of Fig. 4, and showing the hopper, conveyor member and its lower mounting, and a fragment of the vehicle body, Fig. 11 is a fragmentary sectional elevation similar to Fig. 4, but showing a modified arrangement of the clearing mechanism for the conveyor member, Fig. 12 is a view similar to Fig. 1, but showing, upon a rather larger scale, a modification of the means for relative movement between the conveyor mechanism and the hopper, Fig. 13 is an end elevation of one of the vanes of the conveyor member, Fig. 14 is an elevational view of such vane viewed from the right of Fig. 13, parts being broken away in the interest of clearness, Fig. 15 is a perspective view of one of the abutment members of a vane, and Fig. 16 is a fragmentary perspective view showing one of the stop members of a vane.

Referring particularly to Figs. 1 to 4, it will be seen that the vehicle body 1 has a floor or bottom 1' and a slanting or inclined rear end 2 of open formation defined by the side rails 3 against which abuts the conveyor housing frame 4 which, in effect, forms a tail gate pivoted at its upper end to the vehicle body 1 by suitable ears 5 and pivot pins 6, and secured to the vehicle body in operative position by oppositely disposed releasable clevis and clamping bolt means 7—8. Hydraulic cylinder means 9 (Fig. 2), or the like, serve, when required, to raise the conveyor housing frame and its associated parts and mechanisms to open, load-discharging, position, as shown in broken lines.

It will be noted by reference to Fig. 4 that the conveyor housing frame 4 carries the hopper 10 into which refuse is dumped, and that both the housing frame 4 and the hopper 10 are in open communication with the interior of the body of the vehicle through the open rear end thereof.

Pivoted on trunnions 11 at the upper end of the housing frame 4, and extending downwardly therefrom into the hopper 10 is an enclosed conveyor frame comprising preferably channel shaped chain guides 12 provided with side closure plates 12a and reinforced by cross braces 13 and 14. This frame is capable of an oscillatory movement about its pivots 11, with the oscillatory movement at its lower end being limited by a link means 15 having one end affixed to a pivot 16 secured to the housing frame 4 and connected at its other end with the crank arm 17 of a lever oscilatable upon a fixed shaft 18. Oscillatory movement of the frame is guided by oppositely disposed guide ribs 19 fixed to the side walls 10a of the hopper and cooperating rollers 20 carried by the frame in a manner hereinafter more particularly described.

As will be seen by reference particularly to Figs. 5, 9 and 10, the conveyor frame is provided at both sides, and extending to its lower end, with radially extending flanges 12b which are arranged in close lateral proximity to the inner faces of the side walls 10a of the hopper and serve to close the openings 10b provided therein to accommodate oscillatory movement of the conveyor frame and its mechanism (see Figs. 8 and 9). Also, these flanges 12b, together with the brackets 12c, provide bearings for the oppositely disposed shafts 20a of the rollers 20, these shafts passing through limiting slots 10c formed in the side walls 10a of the hopper. Substantialy horizontally arranged supporting struts 10d, secured to the upper edges of the hopper 10 and to the housing frame 4, and in relatively close lateral proximity to the outer faces of the closure plates 12a of the conveyor frame, serve as a framework for the hopper to support the hopper rigidly upon the housing frame 4 while permitting sufficient clearance for relative oscillatory movement of the conveyor frame.

Adjacent to the upper end of the conveyor frame 12—13—14 is journalled the conveyor drive shaft 21 to which power is imparted, preferably at both of its ends, by oppositely disposed fluid (hydraulic) motors 22 and 23 through conventional trains of reducing gears housed within the casings 24—25 and 26, respectively, as indicated conventionally in dot and dash lines, Figs. 1 and 2.

This drive shaft has keyed thereon, or otherwise appropriately affixed for rotation therewith in the direction of the arrows, Figs. 4 and 5, a pair of axially spaced drive sprockets 27 (Figs. 4, 5 and 11), only one of which is shown, which mesh with the upper turns of endless conveyor chains 28 having rollers 29 (Fig. 7) bearing upon the flanges of the chain guides 12. The working and idler or return passes of these conveyor chains serve to support and guide the working and idler passes 30 and 31, respectively, of the conveyor member.

The lower turns of the conveyor chains 28 travel on supporting and guiding discs 32, Figs. 4, 6 and 10, mounted axially of and affixed to the fixed shaft 18. As a means for adjusting the tightness of the chains 28 in the chain guides 12 around the discs 32 there are provided oppositely disposed bearing plates 33 (Figs. 6 and 10) for the shaft 18 against which plates abut the ends of adjusting screws 34 (Figs. 4, 6 and 10) having their bearings in the cross brace 14. The bearing plates 33 are arranged in contact with the inner faces of the side plates 12a of the conveyor frame 12—13—14 and are secured thereto in adjusted position by bolts 35 threaded into the bearing plates and passing through slots 36 formed in such side plates (see particularly Figs. 1, 2, 3, 6, 8, 10 and 12).

Where they encircle the sprockets 27 and discs 32, the inner flanges of the channel-shaped chain guides 12 are cut away, as indicated at 12', Figs. 4 to 6 and 11, to clear these members for their free engagement with the chains 28.

The conveyor member comprises preferably a plurality of lateral bars or plates 37 (Figs. 5 to 7 and 9) provided with hinge connections 38 of such form as to provide by the bars, in multiple, a closed or impervious working face for the conveyor member serving to seal the opening between the conveyor member and the vehicle body, and having pintles 39 which are connected to the pintles 40 of the conveyor chains 28.

Between the conveyor chains 28 at desired, appropriate intervals throughout their length, and occupying the space which would normally be filled by two adjacent lateral bars or plates 37, are arranged the vanes 41 (Figs. 4 to 7, 9 to 11 and 13 to 16) which are of substantially sector shape in end view. These vanes are pivoted at their apexes upon the pintles 39 in the space afforded by the two bars 37 which they replace in the conveyor member so as to have an adequate, desired oscillatory movement through an angle sufficient to cause them to be presented substantially at right angles to the face of the conveyor member on its working pass while performing their function of conveying refuse from the hopper, and in substantial co-planar relation with the outer face (the working face) of the conveyor member while idling.

As shown in Figs. 5 and 6, the bar 37 ahead of and adjacent to each of the pivot pintles 39 of the vanes 41 is cut away diagonally at 37' to accommodate its vane as the vanes pass with the chains 28 around the sprockets 27 (see Fig. 5) and the ends of the thus cut-away bars are provided with full extra link members 28' (Figs. 5, 6 and 7) to which they are rigidly attached to hold them properly aligned.

Having reference particularly to Fig. 4, and Figs. 7 and 13 to 16, it will be seen that each of the vanes 41 has a solid arcuate side wall 42, end walls 43, a first substantially radial solid working face 44 and a second substantially radial control face 45 of open formation. Adjacent to the edge of the arcuate wall 42, and between the end walls 43 and spaced sector-shaped bearing plates 46 secured to the side wall 42, are arranged rollers 47 journalled upon shafts 48 carried in the end walls 43 and the bearing plates 46. These rollers, as the conveyor member travels under the drive of the sprockets 27 and chains 28 will serve, by engagement with the cam discs 49, rigid on the shaft 18, and cam tracks 50 connected to the discs 49 by pairs of rails 55 (Figs. 6 and 10), to oscillate the vanes 41 so that on approach to and during the working pass 30 of the conveyor member the vane faces 44 of the vanes 41 will offstand substantially normal to the conveyor member with their free edges in operative, refuse-advancing proximity to the inner wall or bottom 51 of the hopper 10. The working faces 44 of the vanes 41, as best shown in Figs. 9 and 14, are generally rectangular in shape and substantially conform in area with the cross-sectional area defined by the conveyor member, flanges 12b, and the wall 51 so that the vanes substantially fill the throat or passageway defined by these members. It will be observed (Fig. 4) that the bottom wall 51 of the hopper 10 has a substantially elliptical shape or contour such that its front or forward wall 51' progressively approaches the lower portion of the conveyor member in the area of the projected vanes. This relationship of the hopper wall and conveyor member is such that these members progressively converge toward each other to a point defined by the above said passageway wherein the vanes substantially fill the passageway. As a result of these converging surfaces, refuse contained in the hopper will be forced forwardly by the vanes and gradually compressed between the walls of the passageway and the impervious conveyor member as the vanes pass through the hopper and into the passageway. To cushion the shock of engagement of the rollers 47 with the cam discs 49, inclined spring contact members 52 secured to the cam tracks 50 (Figs. 4 and 10) are provided. These spring contact members 52 while serving to absorb the shock of the engaging vane rollers 47, serve also to provide an approach guideway for the rollers to the cam discs 49. Upon engagement therewith the rollers will impart a gradual counterclockwise motion to the vanes so that upon contact of the rollers with the cam discs 49 the vane faces 44 will be caused to off-stand substantially normal to the conveyor member. In order that the rails providing connections 55 between the cam discs 49 and the cam tracks 50 may be accommodated to the tensioning adjustment of the conveyor chains 28, these connections comprise clamping bolts 53 secured to the cam discs 49 and passing through slots 54 in the end portions of the connecting rails 55 (see particularly Fig. 6).

Referring to Fig. 4, it will be apparent that during the working pass of the conveyor member the vanes 41 will be held in their operative, refuse-advancing, position by contact of their rollers 47 with the cam track 50, so that the refuse will be raised by a positive displacement from the hopper 10 to a position above the floor or bottom 1' of the vehicle body 1 and progressively moved forward and packed therein. When the rollers 47 leave the upper end of the cam track 50 the vanes 41 may swing by gravity to a position in which their working faces 44 are in substantially the plane of the exterior, or working, face of the conveyor member. If, however, due to possible friction or the presence of refuse either still carried by the vane faces 44 or packed within the vehicle body, the vanes 41 fail to thus gravitate, their vane faces 44 will, as they travel upward, engage a closing member, preferably a roller 56 (Figs. 4, 7 and 11) journalled upon a stub shaft 57 carried by the conveyor frame. This closing movement of the vanes 41 is limited by stop members 58 attached thereto and which will engage the adjacent bars or plates 37 (Figs. 4 to 7, 9 to 11, 13, 14 and 16).

In order to limit oscillatory movement of the vanes 41 in the opposite direction, and primarily to arrest such movement as the conveyor member progresses around the guide discs 32 (see Fig. 6), the vanes 41 are provided with abutment members 59 (Figs. 6 and 13 to 15) pivoted upon stud shafts 60 carried by the bearing plates 46. The abutment members are normally biased to an outwardly projecting position (Figs. 4, 6, 13 and 14) by springs 61 attached at their ends, respectively, to lever arms 62 of the abutment members and to extensions 63 of the shafts 48 of the rollers 47, which shafts are fixed in the end walls 43 and bearing plates 46 of the vanes, but the abutment members 59 are capable of inward movement upon their pivots 60 so that, as shown in Fig. 5, they may accommodate the vanes 41 in their closed position as they pass with the chains 28 around the driving sprockets 27. As shown in Figs. 5 and 6, particularly, the abutment members function by virtue of their engagement with the adjacent hinges 38 of the conveyor bars 37.

In order that no appreciable amount of refuse will be carried over by the conveyor member from its working pass to its idle pass, a clearing mechanism 64 may, optionally, be mounted in operative proximity to the conveyor member where it passes around the driving sprockets 27 as shown in Figs. 4 and 5, or in proximity to a flat planar portion of the conveyor member as shown in Fig. 11. This clearing mechanism preferably comprises a cylinder 65 mounted for rotation upon a pair of fixed, non-rotating, trunnions 66 and driven by a pair of gears 67, 68 from a shaft 69 to which drive is imparted by a chain 70 (Fig. 2) through a driven sprocket 71 from a drive sprocket 72 in the train of gearing of the drive for the main shaft 21, idler sprockets 73, 74 being provided to accommodate this chain drive to relative motion on the pivots 11 between the conveyor frame 12—13—14 and the conveyor housing frame 4.

Within the cylinder 65 of the clearing mechanism is arranged a preferably substantially cylindrical beam 75 provided with substantially radially offstanding opposite ribs or bosses 76 each carrying an axially aligned series of pins 77 which register with and are alternately projected through and retracted within complemental retaining and guiding openings 78 in the peripheral wall of the cylinder 65 by yoke mechanism (only one of which is shown) including at each end of the beam 75 an anti-friction bearing member 79 rotatable upon an eccentric extension 80 of its respective trunnion 66 and in engagement with opposite walls of a rectangular recess 81 in its respective end wall 82 of the beam 75. It will be apparent, as shown in Figs. 5 and 11, that projection and retraction of the clearing pins 77 will be effected as they approach and pass the travelling conveyor member, and that they are projected into such close proximity to the outer, or working, face of the conveyor member as to strip or detach therefrom any adhering particles of refuse, and, due to the direction of rotation of the cylinder 65 being counter-clockwise as viewed in Fig. 5, will project such particles, or cause them to fall, into the vehicle body. It is to be noted, also, that the peripheral speed of rotation of the cylinder 65 is preferably sufficiently greater than the linear speed of travel of the conveyor member to make possible repeated functioning of the clearing pins with relation to a given extent of the conveyor member. Moreover, as a result of the retraction of the pins 77 within the peripheral surface of the cylinder 65, any material which might attach itself to these pins will be wiped off.

In order that the pins 77 may, during their passage past the face of the conveyor member, clear the stop members 58 of the vanes, these stop members are provided with recesses 83 to accommodate the aligned pins, as will be understood particularly by reference to Figs. 7 and 16.

In order that refuse conveyed into the vehicle body, and packed therein, may not interfere with operation of the clearing mechanism, or be permitted to pass thereover and enter the conveyor housing, with possible fouling of the conveyor mechanism, guard means 64a, Fig. 5, or 64b, Fig. 11, are provided, and serve to close and house the space in the conveyor housing above the clearing mechanism 64 and the drive mechanism for the conveyor member.

Instead of providing merely for oscillation of the conveyor mechanism about the pivots 11 in order to accommodate it to the materials or articles in the hopper 10 which might cause fouling of the conveyor member, as hereinbefore described, provisions for additional movement of the conveyor mechanism may be had in the manner illustrated in Fig. 12. In this modification the assembly of the conveyor member is pivoted not only on the trunnions 11, but also upon the links 11', which links may be pivoted also preferably upon, or in substantial axial alignment with, the main drive shaft 21. Thus, when an obstruction is encountered by the vanes 41 during their passage through the hopper 10, the assembly of the conveyor member may move upwardly in addition to its outward oscillation, as indicated in broken lines, Fig. 12, to clear such obstruction. Suitable abutments 10e will preferably be provided adjacent to the edges of the openings 10b in the hopper side walls 10a to furnish rigid stops against which the conveyor member assembly may strike to limit its oscillatory movement. Of course, the crank and link mechanism 15, 16, 17 will limit upward movement upon the parts 11, 11', 21.

In normal operation the force of gravity serves to hold the conveyor member assembly in the at-rest position shown in Figs. 1 to 3 and 5, and in full lines in Fig. 12, due to its relatively great weight and the location of the pivots 11 upon which it may oscillate, and hence serves, also, to return it to such at-rest position after it has oscillated, as shown in Fig. 8 and in broken lines in Fig. 12, to permit passage of the vanes over obstructions present in the hopper.

It will be noted, moreover, that in the embodiment of Figs. 1 to 11 the guides 19 and cooperating rollers 20 serve to relieve the trunnions 11 of the main shock of impact when the vanes 41 strike obstructions resting upon the bottom wall 51 of the hopper 10 and which they cannot advance with them through the throat and into the vehicle body.

In actual operation of the apparatus of the invention it has been found that the weight of the conveyor assembly, and its ability to oscillate to a limited extent, is sufficient to crush many articles introduced into the hopper, or to break them down to a size, which makes possible their advance through the hopper and throat and into the vehicle body. In fact, lengths of 2" x 4" lumber thrown into the hopper were broken to a size which permitted them to be advanced into the vehicle body.

The operation of the apparatus is as follows: Assuming that the motors 22 and 23 are driving the shaft 21 at proper operative speed, and that, through the sprockets 27 and chains 28 appropriate linear travel is hence imparted to the conveyor member; and assuming, also, that the clearing mechanism 64 is properly driven by the chain and sprocket gearing 70—74, it will be apparent, by reference particularly to Figs. 4 to 6 and 9 to 11, that as the idle pass 31 of the conveyor approaches the cam discs 49 the rollers 47 of the vanes 41 of the conveyor member will strike against the buffer springs 52 and be guided thereby onto these cam discs with the result that the successive vanes 41 will be rotated upon their pivots 39, and arrested in such rotation by the abutment members 59, so that their working faces 44 will offstand substantially normal to the outer face of the conveyor member. Then, as the conveyor member is carried around the supporting and guiding discs 32 by cooperation of the chains 28 with such discs, the rollers 47, by their engagement with the cam discs 49, will maintain the vanes in this desired position so that they will sweep through the hopper 10 in such proximity to the inner or bottom wall 51 thereof as to carry with them and compress refuse dumped into the hopper.

As the vanes progress through the hopper and pass into the throat formed by and between the closed working face of the conveyor member, the flanges 12b, and the front wall 51' of the hopper, their rollers 47 will pass from the cam discs 49 by way of the rails 55 onto the cam tracks 50 and they will thus be rigidly held in their desired angular position off-standing from the working face of the conveyor member and will carry the refuse upwardly with them through the throat and above and onto the floor or bottom 1' of the vehicle body 1. Obviously, due to the impervious construction of the conveyor, including the plates 37 and vanes 41, the refuse, while being conveyed, is confined within the passageway and prevented from dropping into the inner portions of the conveyor mechanism. As more and more refuse is thus carried upwardly from the hopper into the vehicle body it will be piled up and moved forwardly therein under the influence and urge of successive vane loads which have been given a preliminary packing pressure during their passage through the throat, and will be packed relatively solidly into the body and confined therein by the closed working face of the conveyor member which functions in combination with the flanges 12b, to seal the opening at 2 at the rear of the vehicle body.

When the rollers 47 leave the upper ends of the cam tracks 50 the vanes 41 will be able to swing upon their pivots 39, either under the influence of gravity or by contact of their working faces 44 with the packed refuse in the vehicle body, so that they will assume a closed position with their said working faces 44 in planar alignment with the working face of the conveyor member and will be stopped in this position by the stop members 58. If, however, they fail thus to swing they will, upon contact of their working faces with the closing roller 56, be forced into the desired closed position.

Continued upward travel of the conveyor member with the vanes of its working pass 30 in closed position will bring its working face into the zone of operation of the clearing device as shown either in Figs. 4, 5 and 7, or in Fig. 11, and as this device rotates, with projection of its sets of pins 77 into close proximity to, and substantially into wiping contact with, the working face of the conveyor member, any particles of refuse adhering to, or otherwise carried by, the said face of the conveyor member will be separated therefrom and, due to the counter-clockwise rotation of the clearing device, swept thereoff into the vehicle body. It is to be noted, moreover, that due to the presence of the guard means 64a, 64b, refuse packed into the vehicle body, or particles of refuse swept thereinto from the conveyor member by the clearing mechanism, cannot enter the space in the conveyor housing above the conveyor mechanism and cannot, therefore, be carried over with the idle pass 31 of the conveyor member or foul the operating mechanism.

As hereinbefore explained, having reference particularly to Fig. 5, the spring biasing means 61 of the detent members 59 permits them to assume such a position with respect to their vanes 41 as to make possible maintenance of closed position of the vanes as they pass with the chains 28 over the sprockets 27.

It will be understood that the chain guides 12 being continuous and of channel formation and supplemented by the flange means 12b (see Figs. 7, 9 and 10) serve to house the chains 28 and protect them against fouling by the refuse.

Should there be present in the refuse introduced into the hopper 10 materials or articles of such size or shape that they cannot be moved through the hopper and throat with the conveyor mechanism in its normal, at-rest, position, as shown in Figs. 1 to 5, and in full lines in Fig. 12, the oscillatory movement of the conveyor mechanism hereinbefore described, and as shown in Fig. 8, and in broken lines in Fig. 12, may take place, and it is to be noted that, as shown in Fig. 4, and particularly in Fig. 8, the flange means 12b are of sufficient extent to effectively close the openings 10b in the side walls 10a of the hopper and the extensions of these openings in the housing frame 4 (Fig. 8) when such movement takes place. Obviously, if the movement thus afforded is not sufficient to prevent jamming of the conveyor member, and this will rarely occur, as has been determined in actual practice, drive of the conveyor member will have to be arrested until the obstruction can be cleared.

Various changes and modifications are considered to be within the principle of the invention and the scope of the following claims.

What I claim is:

1. In a refuse vehicle, means defining a closed compartment, a hopper provided with a refuse receiving opening and mounted adjacent to a lower portion of the compartment, means defining an opening extending from the hopper to the compartment, a chain conveyor extending from the hopper upwardly into communication with the compartment, said chain conveyor having a plurality of material moving vanes thereon each of which is pivotally connected to the conveyor for movement from an operative position projecting substantially at right angles thereto to a retracted position, plate means extending the full width of the chain conveyor and attached to the sides thereof for forming with said vanes a continuous impervious wall to prevent passage of material from one side of the plane of the conveyor to the other, wall members cooperating with the said plate means and vanes of the conveyor for forming a completely enclosed passageway leading from the hopper to the compartment, said vanes having an area in their projected position which is substantially equal to the cross-sectional area of the passageway, means for projecting the vanes into operative position to engage material in the hopper, said means being effective to hold the vanes in projected position until after they have discharged material at the upper inner end of the passageway, and a wall of the hopper converging toward the conveyor in the region where the vanes are projected to cause the conveyor and the vanes of the conveyor to compress material against said wall.

2. In a refuse vehicle, means defining a closed compartment, a hopper provided with a refuse receiving opening and mounted adjacent to a lower portion of the compartment, means defining an opening extending from the hopper to the compartment, a chain conveyor extending from the hopper upwardly into communication with the compartment, said chain conveyor having a plurality of material moving vanes thereon each of which is pivotally connected to the conveyor for movement from an operative position projecting substantially at right angles thereto to a retracted position, plate means extending the full width of the chain conveyor and attached to the sides thereof for forming with said vanes a continuous impervious wall to prevent passage of material from one side of the plane of the conveyor to the other, said vanes and plate means extending transversely substantially the full width of said compartment, wall members cooperating with the said plate means and vanes of the conveyor for forming a completely enclosed passageway leading from the hopper to the compartment, said vanes having an area in their projected position which is substantially equal to the cross-sectional area of the passageway, means for projecting the vanes into operative position to engage material in the hopper, said means being effective to hold the vanes in projected position until after they have discharged material at the upper inner end of the passageway, and a wall of the hopper converging toward the conveyor in the region where the vanes are projected to cause the conveyor and the vanes of the conveyor to compress material against said wall.

3. In a conveyor mechanism for refuse trucks, the combination with a truck body having an open end, of means for loading material into said body, including a housing frame having its upper end pivoted to the body at the open end thereof and providing a tail gate swingably movable relatively to said open end, a material receiving hopper carried by said housing frame at its lower end and disposed thereby in communication with said open end of the body, a travelling conveyor member carried by and extending vertically of said housing frame and having a working pass for upward travel over the open end of the body and normally in operative proximity to a wall of said hopper, a conveyor housing pivoted at its upper end to said housing frame and provided adjacent to its upper and lower ends with bearing and driving means for said conveyor member, the pivotal mounting of said conveyor housing and with it of said conveyor bearing and driving means with respect to said housing frame serving to permit separation of said conveyor member from said hopper wall in the event of engagement by said conveyor member of material in said hopper of a size which cannot be accommodated by the space afforded by the normal operative proximity of the conveyor member to said hopper wall.

4. In a conveyor mechanism for refuse trucks, a linearly travelling elongated continuous conveyor member, a housing for said conveyor member including side plates, bearing means spaced longitudinally of said side plates to support shafts and sprocket means for mounting said conveyor member in a working pass and an idle pass, means for driving one of said shafts, means adjacent to one of said mounting means for defining a wall forming with said housing a closed space within which said conveyor travels, said wall providing a surface with respect to which the working pass of said conveyor member travels in normally constant predetermined separation to move material to be conveyed therealong, means serving to permit abnormal separation of the working pass of said conveyor member from said wall in the presence of bodies of said material of a size which cannot be accommodated by said normal separation, said means including a pivot for said housing adjacent to the mounting means remote from said wall and upon which said conveyor member may be oscillated to alter the spacing between the other of said mounting means and said wall, and means provided adjacent to said other mounting means for limiting the extent of separation between the working pass of the conveyor member and said wall.

5. In a conveyor mechanism, a movable conveyor member adapted to convey material from a point of introduction to said conveyor member to a point of discharge therefrom, and means arranged adjacent to said discharge point for clearing from said conveyor member portions of the conveyed material which may adhere thereto, said clearing means comprising a member rotatable relatively to the adjacent face of said conveyor member and carrying a plurality of pins spaced laterally of said conveyor member face, and means for automatically projecting and retracting said pins as said rotatable member rotates.

6. A conveyor mechanism as claimed in claim 5, in which said rotatable member comprises a cylinder, and the means for projecting and retracting said pins includes a member reciprocable substantially diametrically of said cylinder and carrying said pins in position for projection and retraction through the peripheral wall of said cylinder, and means for imparting rotation to said cylinder and therethrough imparting diametrical reciprocation to said reciprocable means.

7. In a conveyor mechanism for moving material from a zone of deposit to a zone of storage, a conveyor member assembly including a plurality of relatively articulated transverse bars to form a multi-part belt-like conveyor member, conveyor vanes interposed intermediate and pivotally mounted with respect to selected bars of said plurality of bars and closing the spaces in said conveyor member thus provided for them, means for mounting said conveyor member for linear travel between said zone of deposit and said zone of storage, and means for imparting such linear travel to said conveyor member, the pivotal mounting of the vanes providing for their oscillatory movement from a position offstanding substantially normal to the working face of the conveyor member to a position in substantial coplanar arrangement with said face, and said vanes being formed with angularly disposed walls which will serve when in either position respectively to close said spaces, this formation of said vanes and their arrangement with relation to adjacent bars being such, therefore, that the pivots between the several bars and between the bars and vanes of said conveyor member will provide articulation in a manner which enables the conveyor to present a substantially impervious septum between the said two zones.

8. Mechanism for loading refuse trucks including, hopper means disposed on the lower portion of the tailgate for a refuse truck body provided with spaced vertical upwardly extending side walls intersecting the tailgate surface, said tailgate being provided with a discharge opening between the side walls above the hopper means in communication with the truck body interior, conveyor means of the endless travelling pan and spaced oscillatory flight type transversely disposed between said side walls to compact and move refuse confined therebetween from the hopper means to the discharge opening, said conveyor means including means to move said pans and the leading edge of said flights in a generally elongate elliptical path, said path as a whole being offset from the vertical whereby pans and flights are moved from the hopper means to the discharge opening in engagement with refuse along the lower longitudinally extending portion of the ellipse, said flights being normally disposed in retracted position under the influence of gravity during said returning movement, each of said flights being provided with a cam element disposed when the flight is thus retracted forwardly of the leading edge of the flight and closely adjacent the plane defined by the path of travel thereof, a cam slide supported on a side wall for engagement with the cam elements to maintain flights in projected position, and tripper means supported by a side wall extending between said upper and lower paths of travel for momentary engagement with a flight below the plane of the cam element to project said flight before engagement of the cam element and slide, whereby stresses resulting from said projecting movement will be minimized.

9. In a conveyor mechanism, an endless travelling conveyor member mounted to provide a working pass and an idle pass, a plurality of conveyor vanes carried by said conveyor member and pivoted transversely thereof for oscillatory movement, each of said vanes being provided with a stop member and an abutment member operative respectively to limit oscillatory movement of said vanes in two directions by engagement with adjacent portions of said conveyor member, said abutment members being pivotally mounted upon said vanes and being resiliently biased to position offstanding from said vanes and serving to arrest oscillation of the vanes to a predetermined offstanding material-conveying position as the conveyor member travels from its idle pass to its working pass, the pivoted and resiliently biased mounting of said abutment members serving to permit a limited movement of said vanes while the abutment members are in oscillation arresting engagement with adjacent portions of the conveyor, and said stop members serving to arrest oscillation of said vanes past a predetermined position during their travel in the idle pass of said conveyor member.

References Cited in the file of this patent

UNITED STATES PATENTS

| | | |
|---|---|---|
| 1,213,640 | Hewitt | Jan. 23, 1917 |
| 1,268,553 | Eirich | June 4, 1918 |
| 1,629,776 | Cutler | May 24, 1927 |
| 2,151,894 | Cambessedes | Mar. 28, 1939 |
| 2,234,465 | Carroll | Mar. 11, 1941 |
| 2,264,674 | Murray | Dec. 2, 1941 |
| 2,351,771 | Lattig | June 20, 1944 |
| 2,494,171 | Goodman | Jan. 10, 1950 |

FOREIGN PATENTS

| | | |
|---|---|---|
| 46,003 | French | Dec. 3, 1935 |
| | (Addition to No. 790,709) | |
| 519,501 | Great Britain | Mar. 28, 1940 |